(12) United States Patent
Wang

(10) Patent No.: US 7,388,691 B2
(45) Date of Patent: Jun. 17, 2008

(54) METHOD OF OPERATING A DOUBLE-SIDED SCANNER

(75) Inventor: Kuo-Jeng Wang, Kaohsiung (TW)

(73) Assignee: Transpecific IP Ltd., Taipei (TW)

( * ) Notice: Subject to any disclaimer, the term of this patent is extended or adjusted under 35 U.S.C. 154(b) by 665 days.

(21) Appl. No.: 10/248,866

(22) Filed: Feb. 26, 2003

(65) Prior Publication Data

US 2004/0165233 A1 Aug. 26, 2004

(51) Int. Cl.
 *H04N 1/04* (2006.01)
(52) U.S. Cl. .................. 358/474; 358/475; 358/509; 250/208.1
(58) Field of Classification Search ................. 358/474, 358/475, 509, 496, 497, 514; 382/313; 399/45; 250/208.1
See application file for complete search history.

(56) References Cited

U.S. PATENT DOCUMENTS

| | | | | |
|---|---|---|---|---|
| 4,727,400 A * | 2/1988 | Ito | ................................ | 355/75 |
| 5,392,135 A * | 2/1995 | Amemiya | ..................... | 358/444 |
| 5,596,400 A * | 1/1997 | Kasamatsu et al. | ............. | 399/45 |
| 5,625,470 A * | 4/1997 | Ueta et al. | .................... | 358/505 |
| 5,875,269 A * | 2/1999 | Yamashita et al. | ........... | 382/312 |
| 6,192,261 B1 * | 2/2001 | Gratton et al. | ............... | 600/310 |
| 6,195,183 B1 * | 2/2001 | Fujimoto et al. | ............. | 358/514 |
| 6,525,840 B1 * | 2/2003 | Haraguchi et al. | ........... | 358/296 |
| 6,552,829 B1 * | 4/2003 | Maciey et al. | ................ | 358/509 |
| 6,753,986 B1 * | 6/2004 | Sato | ............................. | 358/505 |
| 7,027,194 B2 * | 4/2006 | Kanda | .......................... | 358/496 |
| 7,123,390 B2 * | 10/2006 | Sato | ............................. | 358/505 |
| 7,142,335 B2 * | 11/2006 | Tesavis | ........................ | 358/474 |
| 2002/0039207 A1 * | 4/2002 | Kanda | .......................... | 358/498 |
| 2002/0093697 A1 * | 7/2002 | Spears et al. | ................. | 358/514 |
| 2003/0227654 A1 * | 12/2003 | Shiraishi | ...................... | 358/474 |

* cited by examiner

*Primary Examiner*—Aung S. Moe
*Assistant Examiner*—Negussie Worku
(74) *Attorney, Agent, or Firm*—Stolowitz Ford Cowger LLP

(57) ABSTRACT

An operating method for a double-sided scanner is provided. A light source of one particular color inside a first group of light sources and a light source of a different color (or the same color) inside a second group of light source are lit to scan the front and back surface of a scan document. Optical signals from the front and back surface of the scan document are received and converted into analogue electrical signals. Thereafter, the analogue electrical signals are converted into digital electrical signal. Finally, the digital electrical signals are output to a host computer. This invention utilizes two groups of light sources (for example, light-emitting diodes) to serve as light sources for the double-sided scanner. Because light-emitting diodes require no warm-up period and is quick to switch, double-sided scanning is simplified.

50 Claims, 6 Drawing Sheets

METHOD OF OPERATING A DOUBLE-SIDED SCANNER

BACKGROUND OF INVENTION

1. Field of Invention

The present invention relates to a method of operating a scanner. More particularly, the present invention relates to a method of operating a double-sided scanner.

2. Description of Related Art

A scanner is a machine that can be regarded as an intermediate between a photocopier and a camera. In the past, a scanner is an expensive piece of equipment that is deployed by a special user such as an artist. With the progress in computer technologies, there is tremendous drop in the price of the scanner so that a scanner has become an essential peripheral device in most personal computers.

According to the price or function, a scanner may be categorized into several types. In general, scanners can be divided into palm top scanners, paper feed scanners, card scanners, negative film scanners and flatbed scanners. A flatbed scanner has a glass platform for holding a document or a pattern thereon. Data is read into the scanner through the movement of a sensor over the document. Since most flatbed scanner is structurally simple, easy to handle and functionally highly expandable, this is the, type of scanner that computer users are equipped.

Most scanners use a fluorescence lamp to serve as a light source because fluorescence lamps require little warm-up time. However, the lamp has an unstable period after the scanner is activated. If the lamp is used for scanning during the unstable period, a flickering of the image may occur. One method of removing such flickering is to use a cold cathode ray tube. However, one major disadvantage of using g cold cathode ray tube is that a longer warm-up period is required. Furthermore, for a double-side scanning operation, two sets of cold cathode ray tubes must be employed. Aside from the long warming period, scanning of both sides of a document of an image simultaneously is not recommended because the light from the two sets of cold cathode ray tubes might interfere with each other. Typically, the scanning of the front and back of a document needs to be carried out with a slight shift in position. Thus, if cold cathode ray tubes are used as the light source of a double-side scanner, complicated control circuits are demanded.

SUMMARY OF INVENTION

Accordingly, one object of the present invention is to provide a method of operating a double-sided scanner. This invention uses two groups of light sources (for example, light-emitting diodes) to serve as the light source for the double-sided scanner. Because the light-emitting diodes need no warm up period and can be switched on or off quickly, the scanner is able to scan two sides at the same time.

To achieve these and other advantages and in accordance with the purpose of the invention, as embodied and broadly described herein, the invention provides a method of operating a double-sided scanning device. First, the illuminating range of a first group of light sources is controlled such that there is no overlapping with a second group of sensors. At the same time, the illuminating range of a second group of light sources is controlled such that there is no overlapping with a first group of sensors. Thereafter, light sources within the first group of light sources and the second group of light sources having the same color are triggered to illuminate the front and back of a scan document. After receiving the optical signals from the front and back surface of the scan document, the optical signals are converted into analogue electrical signals. The analogue electrical signal is next converted into digital electrical signals. Finally, the digital electronic signals are output to an external device.

In one embodiment of this invention, the first group of light sources includes a red, a green and a blue light source. The second group of light sources also includes a red, a green and a blue light source.

In one embodiment of this invention, the first group of light sources is a first group of light emitting diodes and the second group of light sources is a second group of light-emitting diodes.

This invention also provides an alternative method of operating a double-sided scanner. First, the light sources within a first group of light sources and a second group of light sources having a different color are triggered to illuminate the front and back surface of a scan document. After receiving the optical signals from the front back surface of the scan document, the optical signals are converted into analogue electrical signals. The analogue electrical signals are next converted into digital electrical signals. Finally, the digital electrical signals are output to an external device.

In one embodiment of this invention, the first group of light sources and the second group of light sources are located at the same location.

In one embodiment of this invention, the illuminating range of the first group of light sources overlaps with the scanning range of the second group of sensors.

In one embodiment of this invention, the illuminating range of the second group of light sources overlaps with the scanning range of the first group of sensors.

In one embodiment of this invention, the illuminating range of the first group of light sources overlaps with the scanning range of the second group of sensors and the illuminating range of the second group of light sources overlaps with the scanning range of the first group of sensor.

In one embodiment of this invention, the first group of light sources and the second group of light sources are in different locations.

In one embodiment of this invention, the illuminating range of the first group of light sources does not overlap with the scanning range of the second group of sensors.

In one embodiment of this invention, the illuminating range of the second group of light sources does not overlap with the scanning range of the first group of sensors.

In one embodiment of this invention, the illuminating range of the first group of light sources does not overlap with the scanning range of the second group of, sensors and the illuminating range of the second group of light sources does not overlap with the scanning range of the first group of sensors.

In brief, this invention utilizes two groups of light sources (for example, light-emitting diodes) to serve as the light source for a double-sided scanning device. Since light-emitting diodes need no warm-up period and can be switched on or off quickly, scanning both sides of a document concurrently is relatively simple.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
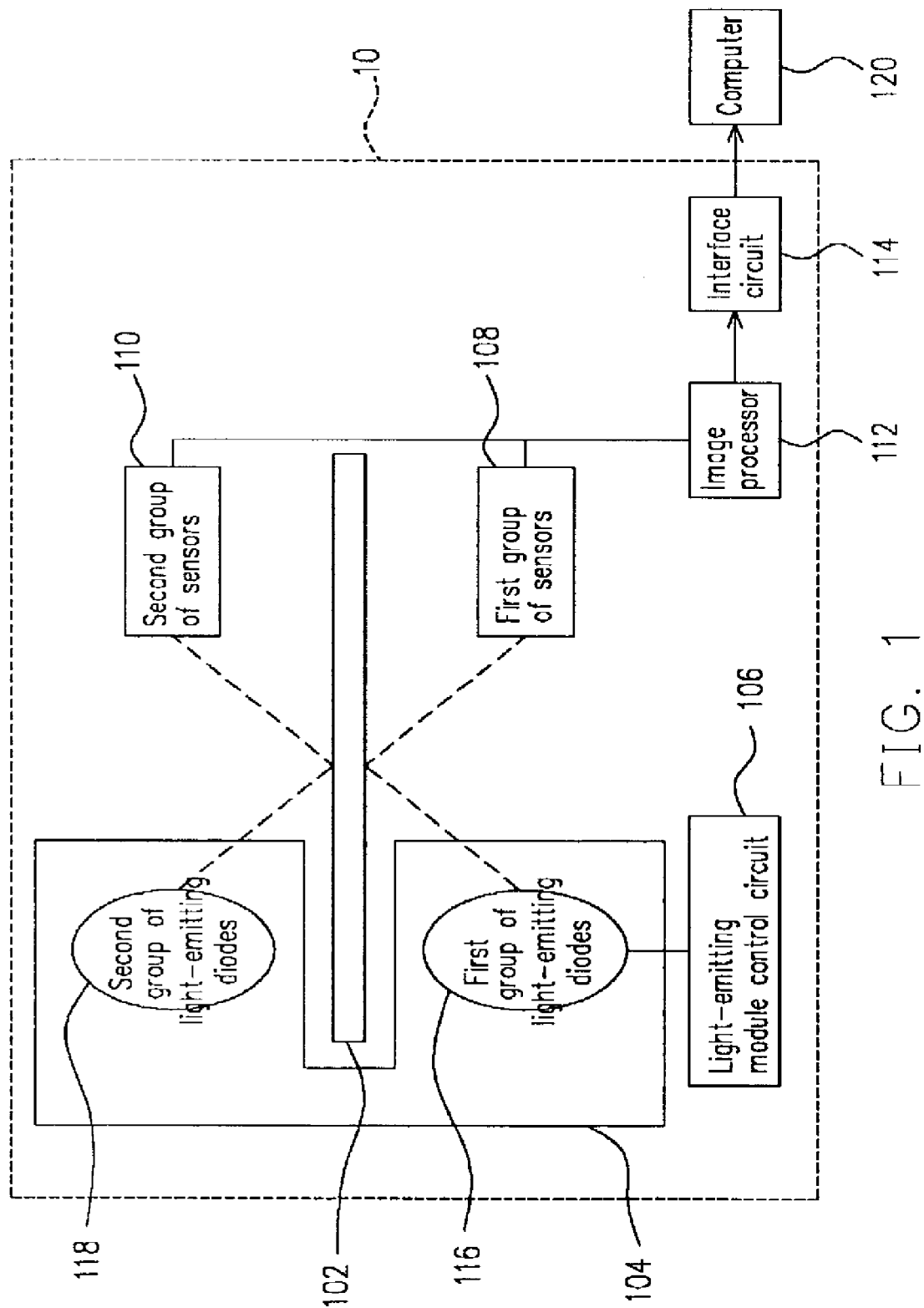
FIG. 1 is a schematic structural layout of a double-sided scanner according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic structural layout of a double-sided scanner according to a first preferred embodiment of this invention. As shown in FIG. 1, the double-sided scanner 10 is used for scanning a document 102. The double-sided scanner 10 includes a light-emitting module 104, a light emitting module control circuit 106, a first group of sensors 108 and a second group of sensors 110, an image processor 112 and an interface circuit 114. The light-emitting module 104 further includes a first group of light sources and a second group of light sources. In the following embodiment of this invention, the first group of light sources is a first group of light-emitting diodes 116 and the second group of light sources is a second group of light-emitting diodes 118. However, anyone familiar with the technology may notice that light-emitting diodes are not the only light sources available. Other types of light sources can be used.

In the following, a description of various sections of the double-sided scanner 10 is presented. The first group of light-emitting diodes 116 serves as a group of light sources for scanning the front surface of the scan document 102. The second group of light-emitting diodes serves as a group of light sources for scanning the back surface of the scan document 102. The first group of light-emitting diodes 116 at least includes diodes for producing red, green and blue light. Similarly, the second group of light-emitting diodes 118 at least includes diodes for producing red, green and blue light. The light-emitting module control circuit 106 is coupled to the light-emitting module 104 for triggering the light-emitting module 104 on to produce light. The first group of sensors 108 receives optical signals reflected from the positive surface of the scan document 102 and converts the optical signals to analogue electrical signals. In this embodiment, the first group of sensors 108 and the second group of sensor 110 can be, for example, charge-coupled devices (CCD) or complementary metal-oxide-semiconductor (CMOS) sensing devices. The image processor 112 receives the analogue electrical signals and converts the signals to digital electrical signals. The interface circuit 114 is coupled to the image processor 112 for outputting the digital electrical signals to a host computer 120.

To simplify the description, the first group of light-emitting diodes 116 includes a first red light-emitting diode, a first green light-emitting diode and a first blue light-emitting diode only. Similarly, the second group of light-emitting diodes 118 includes a second red light-emitting diode, a second green light-emitting diode and a second blue light-emitting diode only. However, anyone familiar with the technology may notice that the first and the second group of light-emitting diodes can include diodes for producing some other colors.

Figure 2:
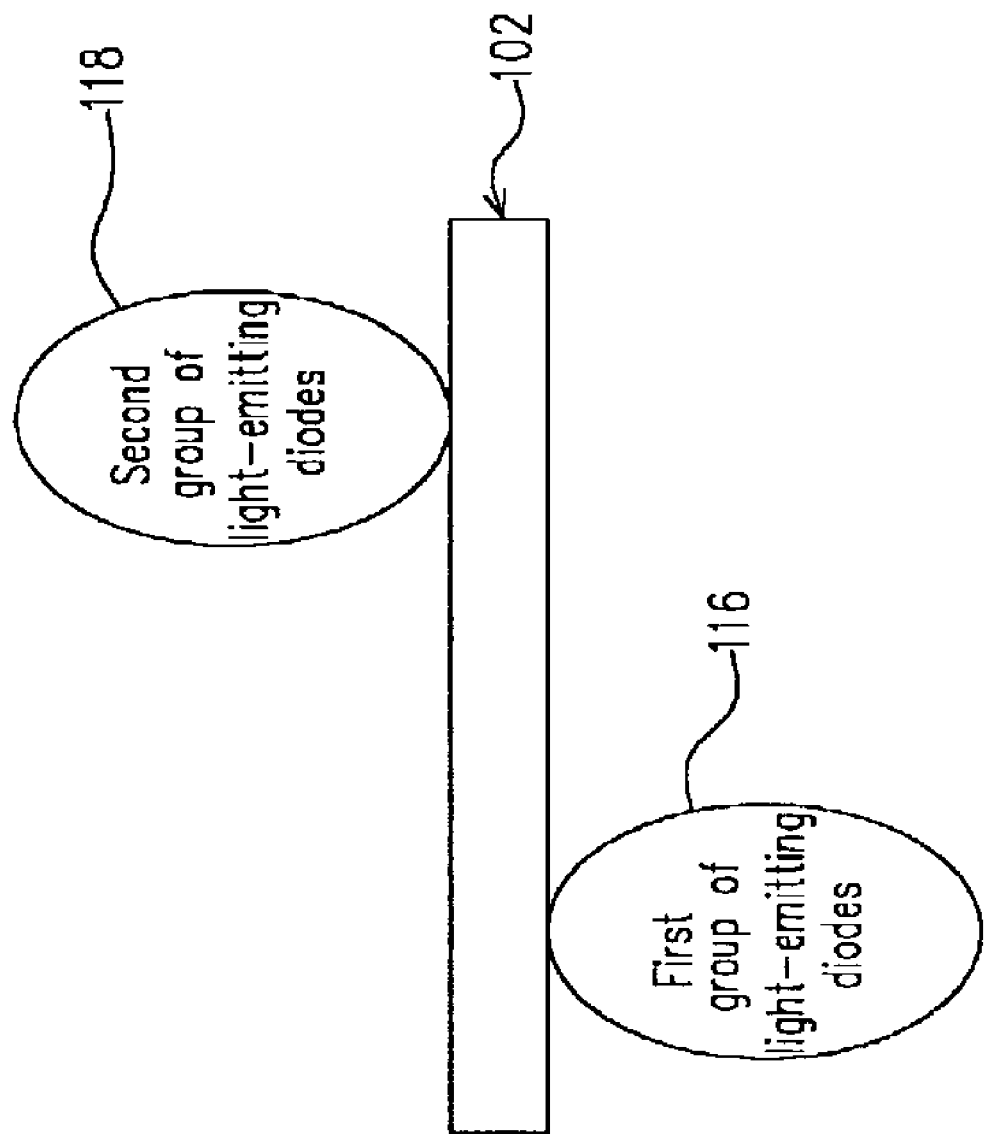
FIG. 2 is a schematic diagram showing a first group of light-emitting diodes and a second group of light-emitting diodes at different locations in the process of a document.

The following is a description of how, with the first group of light-emitting diodes 116 and the second group of light-emitting diodes 118 on different locations on the scan document 102, the light-emitting module control circuit 106 is able to control the timing of light emission in the light-emitting module 104 and hence achieve double-sided scanning. FIG. 2 is a schematic diagram showing the first group of light-emitting diodes 114 and the second group of light emitting diodes 116 at different locations in the process of scanning a document. As shown in FIG. 2, the irradiating light-emitting diodes within the first group of light-emitting diodes 116 and the second group of light-emitting diodes 118 can be the same color or of different colors. That is, the light-emitting module control circuit 106 may trigger all the diodes within the first group of light-emitting diodes 116 and the second group of light-emitting diodes 118 with the same color to emit light. Alternatively, light-emitting diodes of different colors within the first group of light-emitting diodes 116 and the second group of light-emitting diodes 118 emit light. In the following, two embodiments are used to illustrate the aforementioned conditions in more concrete detail.

Figure 3:
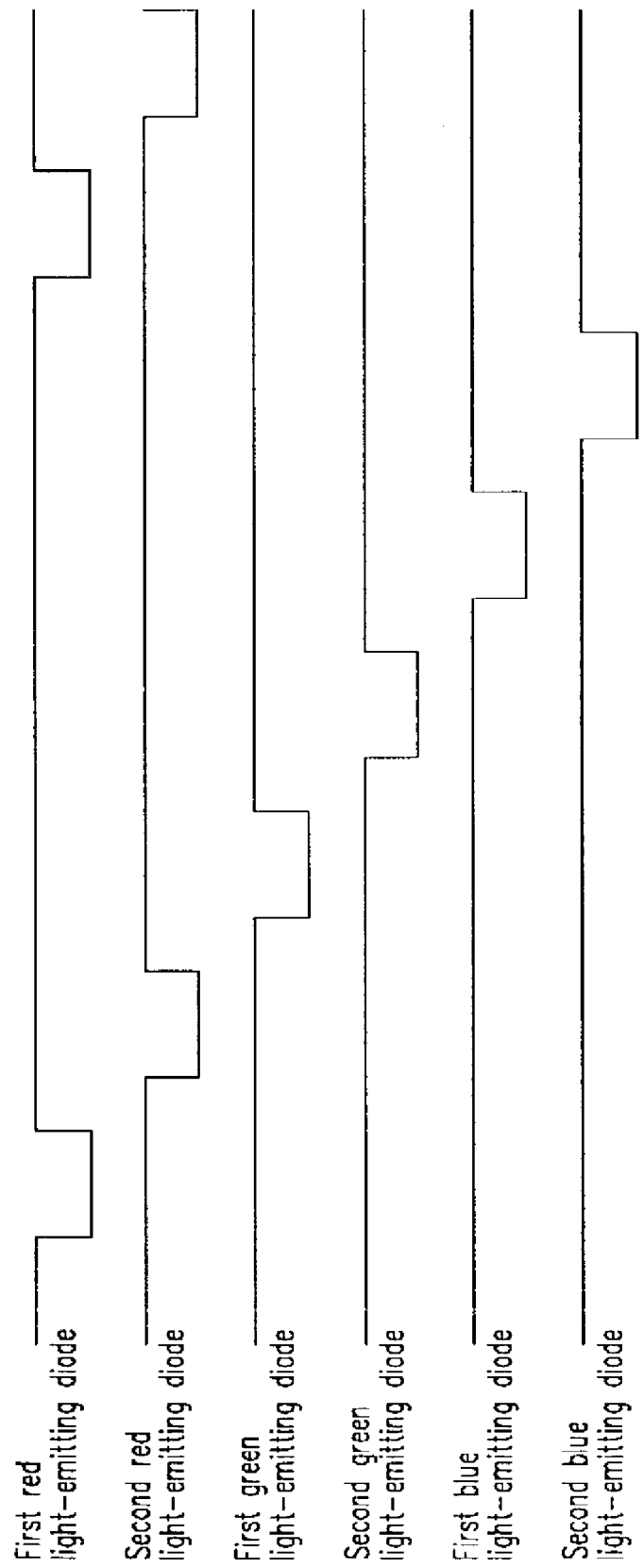
FIG. 3 is a diagram showing a group of timing control signals produced by a light-emitting module control circuit to the light-emitting module for triggering light emission.

FIG. 3 is a diagram showing a group of timing control signals produced by the light-emitting module control circuit 106 to the light-emitting module 104 for triggering light emission. Typically, if a light-emitting diode is maintained at a low potential, this indicates the diode emits light. On the other hand, if the light-emitting diode is maintained at a high potential, this indicates the diode is off. In FIG. 3, the double-sided scanner 10 also controls the first group of light-emitting diodes 116 such that its range of illumination does not overlap with the scanning range of the second group of sensors 110. Similarly, the double-sided scanner 10 also controls the second group of light-emitting diodes 118 such that its range of illumination does not overlap with the scanning range of the first group of sensors 108. The light emitting module control circuit 106 also controls the triggering sequence of the light-emitting module 104 in such a way that the first red light-emitting diode, the second red light-emitting diode, the first green light-emitting diode, the second green light-emitting diode, the first blue light-emitting diode and the second blue light-emitting diodes are lighted up in that order.

Figure 4:
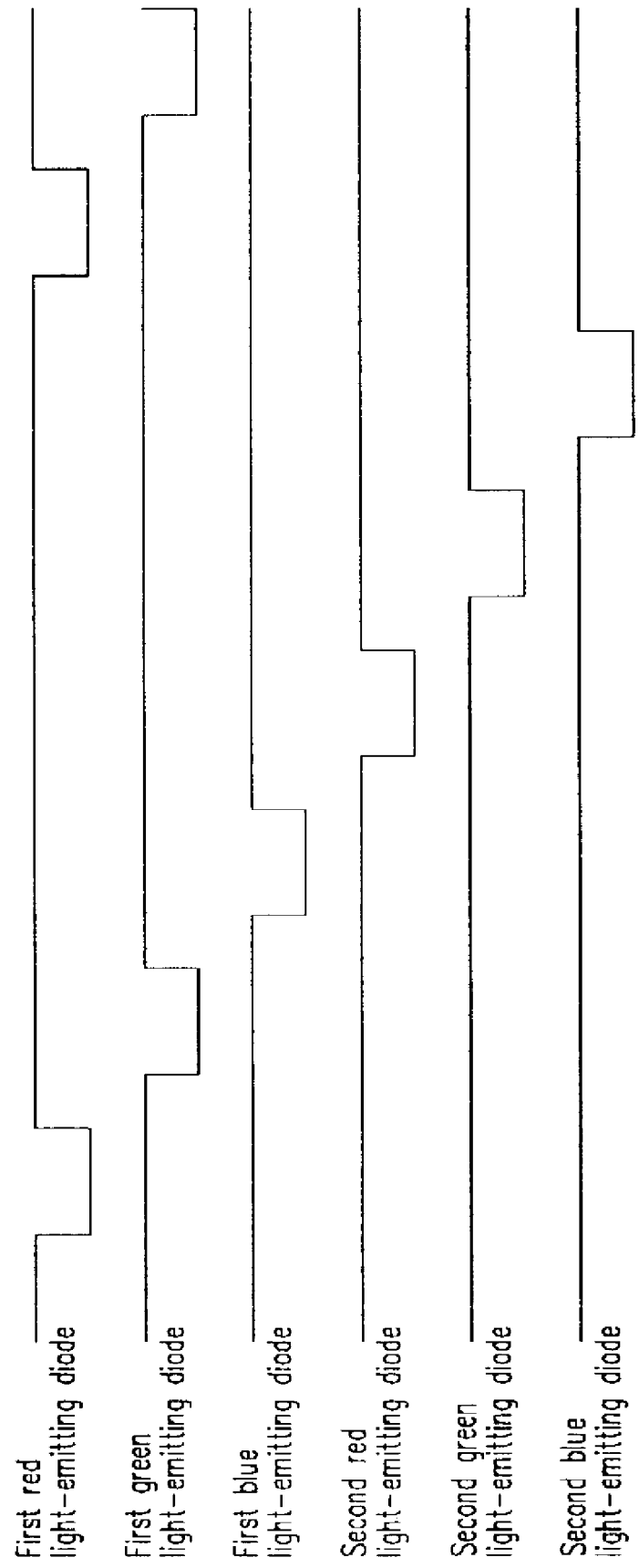
FIG. 4 is a diagram showing an alternative group of timing control signals produced by a light-emitting module control circuit to the light-emitting module for triggering light emission.

FIG. 4 is a diagram showing an alternative group of timing control signals produced by the light-emitting module control circuit 106 to the light-emitting module 104 for triggering light emission. In this embodiment, the light-emitting module control circuit 106 triggers the light-emitting diodes within the first group of light-emitting diodes 116 and the second group of light-emitting diodes 118 to emit different colors. Typically, if a light-emitting diode is maintained at a low potential, this indicates the diode emit light. On the other hand, if the light-emitting diode is maintained at a high potential, this indicates the diode is off. In FIG. 4, the double-sided scanner 10 positions the first group of light-emitting diodes 116 and the second group of light-emitting diodes 118 at different locations. In addition, the double-sided scanner 10 controls the first group of light-emitting diodes 116 such that its range of illumination does not overlap with the scanning range of the second group of sensors 110 or controls the second group of light-emitting diodes 118 such that its range of illumination does not overlap with the scanning range of the first group of sensors 108. Alternatively, the double-sided scanner 10 controls the first group of light-emitting diodes 16 such that its range of illumination does not overlap with the scanning range of the second group of sensors 110 and controls the second group of light emitting diodes 118 such that its range of illumination does not overlap with the scanning range of the first group of sensors 108. The light-emitting module control circuit 106 also controls the triggering sequence of the light-emitting module 104 in such a way that the first red light-emitting diode, the first green light-emitting diode, the first blue light-emitting diode, the second red light-emitting diode, the second green light-emitting diode and the second blue light-emitting diodes are lighted up in that order.

Figure 5:
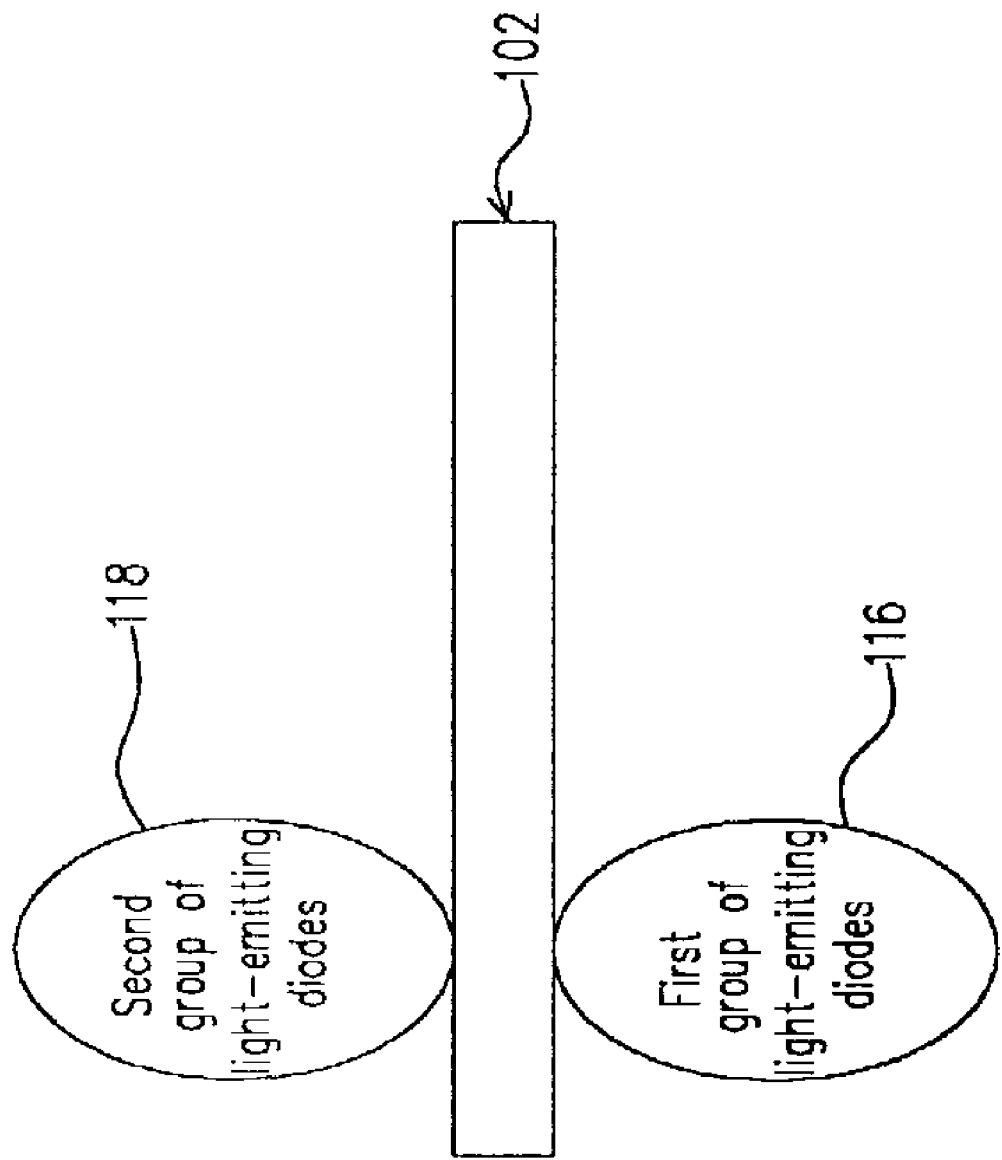
FIG. 5 is a schematic diagram showing a first group of light-emitting diodes and a second group of light-emitting diodes at the same location in the process of scanning a document.

The following is a description of how, with the first group of light-emitting diodes 116 and the second group of light-emitting diodes 118 at the same location on the scan document 102, the light-emitting module control circuit 106 is able to control the timing of light emission in the light-emitting module 104 and hence achieve double-sided scanning. FIG. 5 is a schematic diagram showing the first group of light emitting diodes 116 and the second group of light-emitting diodes 118 at the same location in the process of scanning a document. In FIG. 5, color of the light emitting diodes within the first group of light emitting diodes 116 lit up is different from color of the light-emitting diodes within the second group of light-emitting diodes 118. In other words, the light emitting module control circuit 106 triggers one particular color of the light-emitting diodes within the first group of light-emitting diodes 116 but triggers another color of the light emitting diodes within the second group of light-emitting diodes 118 simultaneously.

Figure 6:
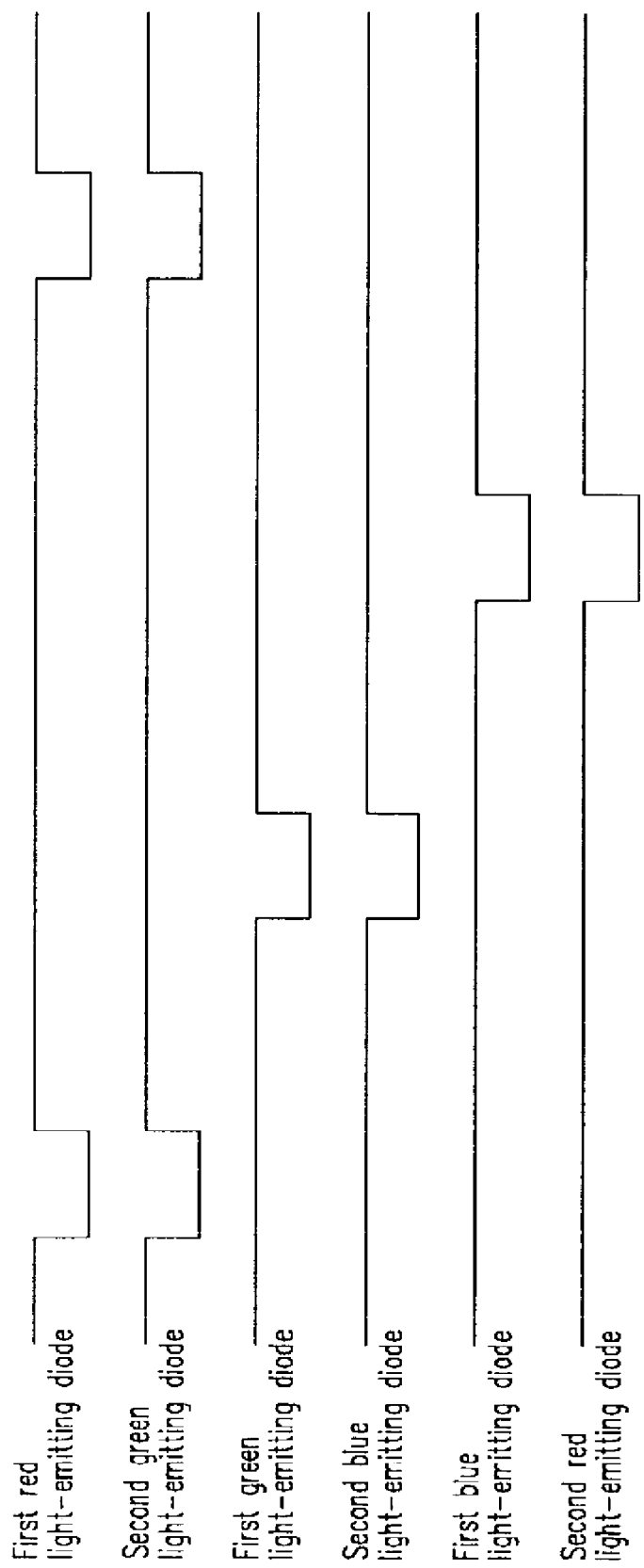
FIG. 6 is a diagram showing a third group of timing control signals produced by a light-emitting module control circuit to the light-emitting module for triggering light emission.

FIG. 6 is a diagram showing a third group of timing control signals produced by the light-emitting module control circuit 106 to the light-emitting module 104 for triggering light emission. In this embodiment, the light-emitting module control circuit 106 triggers the light-emitting diode of one color in the first group of light-emitting diodes 116 and the light-emitting diode of a different color in the second group of light-emitting diodes 118 simultaneously. Typically, if a light-emitting diode is maintained at a low potential, this indicates the diode emit light. On the other hand, if the light-emitting diode is maintained at a high potential, this indicates the diode is off. In FIG. 6, the double-sided scanner 10 positions the first group of light-emitting diodes 116 and the second group of light-emitting diodes 118 at the same locations. In addition, the double-sided scanner 10 controls the first group of light-emitting diodes 116 such that its range of illumination overlaps with the scanning range of the second group of sensors 110 or controls the second group of light-emitting diodes 118 such that its range of illumination overlaps with the scanning range of the first group of sensors 108. Alternatively, the double-sided scanner 10 controls the first group of light-emitting diodes 116 such that its range of illumination overlaps with the scanning range of the second group of sensors 110 and controls the second group of light-emitting diodes 118 such that its range of illumination overlaps with the scanning range of the first group of sensors 108. The light-emitting module control circuit 106 also controls the triggering sequence of the light-emitting module 104 in such a way that the first red light-emitting diode and the second green light-emitting diode are lit simultaneously, then the first green light-emitting diode and the second blue light-emitting diode are lit simultaneously, and finally, the first blue light-emitting diode and the second red light-emitting diode are lit simultaneously.

In summary, this invention utilizes two groups of light-emitting diodes to serve as the light source for a double-sided scanning device. Since light-emitting diodes need no warm-up period and can be switched on or off quickly, scanning both sides of a document concurrently is simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An apparatus comprising:
a light-emitting module comprising a first light source having a first illuminating range capable of illuminating a front surface of a document being scanned, and a second light source having a second illuminating range and capable of illuminating a back surface of said document,
wherein said first light source comprises a first light element configured to emit light of a first color and a second light element configured to emit light of a second color that is different from the first color, and wherein said second light source comprises a third light element configured to emit light of a third color and a fourth light element configured to emit light of a color that is different from the third color;
a first light sensor having a first scanning range and capable of scanning said front surface of said document; and
a second light sensor having a second scanning range and capable of scanning said back surface of said document;
wherein said first scanning range does not overlap with said second illuminating range and said second scanning range does not overlap with said first illuminating range; and
wherein said apparatus is configured to control a timing of said scanning such that said first light source and said second light source do not emit light from light elements of the same color simultaneously.

2. The apparatus of claim 1, wherein said first light source and said second light source each comprise a red light element, a green light element and a blue light element.

3. The apparatus of claim 2, wherein said apparatus is configured to control said timing such that said first light source and said second light source do not activate said red light elements simultaneously, said first light source and said second light source do not activate said green light elements simultaneously and said first light source and said second light source do not activate said blue light elements simultaneously.

4. The apparatus of claim 2 wherein said first light source is configured to activate said red light element and said second light source is configured to activate said red light element thereafter, said first light source is configured to activate said green light element and said second light source is configured to activate said green light element thereafter, and said first light source is configured to activate said blue light element and said second light source is configured to activate said blue light element thereafter.

5. The apparatus of claim 1 wherein the apparatus is further configured to control said timing such that said first light source and said second light source activate said light elements in a sequential order.

6. The apparatus of claim 1 wherein the apparatus is further configured to control said timing such that said first light source activates each of said light elements before said second light source activates any of said light elements.

7. A method of operating a device for scanning two sides of a document, the method comprising:
   emitting light from a first light source having a first illuminating range for illuminating a front surface of a document being scanned, wherein said first light source comprises a first light element that emits light of a first color and a second light element that emits light of a second color;
   emitting light from a second light source having a second illuminating range for illuminating a back surface of said document, wherein said second light source comprises a third light element that emits light of a third color and a fourth light element that emits light of a fourth color; and
   controlling a timing of said emitting such that said first light source and said second light source do not emit light from light elements of the same color simultaneously.

8. The method of claim 7 wherein said first light source and said second light source are positioned such that said first illuminating range and said second illuminating range illuminate said front and back surfaces of said document, respectively, at substantially the same scan location of said document.

9. The method of claim 7 wherein the first light source and second light source each comprise one or more light-emitting diodes.

10. The method of claim 7 wherein said first light source and said second light source each comprise a red light element, a green light element and a blue light element.

11. The method of claim 10 wherein said timing is controlled such that said first light source activates said red light element and said second light source activates said green element concurrently, said first light source activates said green light element and said second light source activates said blue light element concurrently and said first light source activates said blue light element and said second light source activates said red light element concurrently.

12. The method of claim 7 wherein said first and third colors are the same and said second and fourth colors are the same.

13. The method of claim 7 wherein said first and second colors are different and said third and fourth colors are different.

14. A method of operating a device for scanning two sides of a document, the method comprising:
   emitting light from a first light source having a first illuminating range for illuminating a front surface of said document being scanned, wherein said first light source comprises a first light element that emits light of a first color and a second light element that emits light of a second color;
   emitting light from a second light source having a second illuminating range for illuminating a back surface of said document, wherein said second light source comprises a third light element that emits light of a third color and a fourth light element that emits light of a fourth color, wherein said first tight source and said second light source are positioned such that said first illuminating range and said second illuminating range illuminate said front and back surfaces of said document, respectively, at different scan locations of said document; and
   controlling a timing of said emitting such that said first light source and said second light source emit light from light elements of the same color at least partially concurrently.

15. The method of claim 14 further comprising:
   scanning said front surface of said document with a first sensor having a first scanning range;
   scanning said back surface of said document with a second sensor having a second scanning range; and
   controlling said emitting such that said first illuminating range does not overlap with said second scanning range and said second illuminating range does not overlap with said first scanning range.

16. The method of claim 14 wherein the first light source and second light source each comprise one or more light-emitting diodes.

17. The method of claim 14 wherein said first light source and said second light source each comprise a red light element, a green light element and a blue light element.

18. The method of claim 17 wherein said timing is controlled such that said first light source and said second light source activate said red light elements concurrently, said first light source and said second light source activate said green light elements concurrently, and said first light source and said second light source activate said blue light elements concurrently.

19. The method of claim 14 wherein said first and third colors are the same and said second and fourth colors are the same.

20. The method of claim 14 wherein said first and second colors are different and said third and fourth colors are different.

21. A method of operating a device for scanning two sides of a document, the method comprising:
   emitting light from a first light source having a first illuminating range for illuminating a front surface of a document being scanned, wherein said first light source comprises a first light element that emits light of a first color and a second light element that emits light of a second color;
   emitting light from a second light source having a second illuminating range for illuminating a back surface of said document, wherein said second light source comprises a third light element that emits light of a third color and a fourth light element that emits light of a fourth color,
   wherein said first light source and said second light source are positioned such that said first illuminating range and said second illuminating range illuminate said front and back surfaces of said document, respectively, at different scan locations of said document; and
   controlling a timing of said emitting on such that said first light source and said second light source do not emit light from light elements of the same color simultaneously.

22. The method of claim 21 further comprising:
   scanning said first surface of said document with a first sensor having a first scanning range;
   scanning said back surface of said document with a second sensor having a second scanning range; and
   controlling said emitting such that said first illuminating range does not overlap with said second scanning range.

23. The method of claim 21 wherein said first light source and said second light source each comprise a red light element, a green light element and a blue light element.

24. The method of claim 23 wherein said timing is controlled such that said first light source and said second light source do not activate said red light elements simultaneously, said first light source and said second light source do not activate said green light elements simultaneously and said first light source and said second light source do not activate said blue light elements simultaneously.

25. The method of claim 21 wherein said timing is controlled such that said first light source and said second light source activate said light elements in a sequential order.

26. The method of claim 21 wherein said timing is controlled such that said first light source activates each of said light elements before second light source activates any of said light elements.

27. The method of claim 21 wherein said timing is controlled such that said first light source activates said red light element and said second light source activates said red light element thereafter, said first light source activates said green light element and said second light source activates said green light element thereafter, and said first light source activates said blue light element and said second light source activates said blue light element thereafter.

28. The method of claim 21 further comprising controlling said emitting such that said second illuminating range does not overlap with said first scanning range.

29. An apparatus comprising:
a light-emitting module comprising a first light source having a first illuminating range capable of illuminating a front surface of a document being scanned, and a second light source having a second illuminating range capable of illuminating a back surface of said document;
wherein said first light source comprises a first light element configured to emit light of a first color and a second light element configured to emit light of a second color, and said second light source comprises a third light element that configured to emit light of a third color and a fourth light element configured to emit light of a fourth color; and
wherein said apparatus is configured to control a timing of said scanning such that said first light source and said second light source do not emit light from light elements of the same color simultaneously.

30. The apparatus of claim 29, wherein said first light source and said second light source are positioned such that said first illuminating range and said second illuminating range illuminate said front and back surfaces, respectively, of said document at substantially the same scan location of said document.

31. The apparatus of claim 29, wherein said first light source and said second light source each comprise a red light element, a green light element and a blue light element.

32. The apparatus of claim 29, wherein said apparatus is configured to control said timing such that said first light source activates said first light element and said second light source activates said fourth light element concurrently and said first light source activates said second light element and said second light source activates said third light element concurrently.

33. The apparatus of claim 29 wherein said apparatus is configured to control said timing such that said first light source and said second light source do not activate said red light elements simultaneously, said first light source and said second light source do not activate said green light elements simultaneously and said first light source and said second light source do not activate said blue light elements simultaneously.

34. An apparatus comprising:
a light-emitting module comprising a first light source having a first illuminating range capable of illuminating a front surface of a document being scanned, and a second light source having a second illuminating range capable of illuminating a back surface of said document, said first light source comprising a first light element configured to emit light of a first color and a second light element configured to emit light of a second color and said second light source comprising a third light element configured to emit light of a third color and a fourth light element configured to emit light of a fourth color;
a first sensor having a first scanning range and capable of scanning said front surface of said document; and
a second sensor having a second scanning range and capable of scanning said back surface of said document;
wherein said first scanning range does not overlap with said second illuminating range and said second scanning range does not overlap with said first illuminating range; and
wherein said apparatus is configured to control a timing of said scanning such that said first light source and said second light source emits light from light elements of the same color at least partially concurrently.

35. The apparatus of claim 34 wherein said first color and said second color are different colors and said third color and said fourth color are different colors.

36. The apparatus of claim 34 wherein said first light source and said second light source each comprise a red light element, a green light element and a blue light element.

37. The apparatus of claim 36 wherein said apparatus is configured to control said timing such that said first light source and said second light source activate said red light elements concurrently, said first light source and said second light source activate said green light elements concurrently and said first light source and said second light source activate said blue light elements concurrently.

38. An apparatus comprising:
a light-emitting module comprising a first light source having a first illuminating range capable of illuminating a front surface of a document being scanned, and a second light source having a second illuminating range capable of illuminating a back surface of said document, wherein said first light source comprises at least a first light element configured to emit light of a first color and a second light element configured to emit light of a second color that is different than the first color and said second light source comprises at least a third light element configured to emit light of a third color and a fourth light element configured to emit light of a fourth color that is different than the third color;
a first group of sensors associated with said first light source, said first group of sensors comprising at least two sensors and having a first scanning range capable of scanning said front surface of said document; and
a second group of sensors associated with said second light source, said second group of sensors comprising at least two sensors and having a second scanning range capable of scanning said back surface of said document;
wherein said apparatus is configured to control a timing of said scanning such that said first light source and said second light source emit light from light elements of the same color at least partially concurrently.

39. The apparatus of claim 38 wherein said first group of light sources and said second group of light sources are positioned such that said first illuminating range and said second illuminating range illuminate said front and back surfaces of said document at substantially the same scan location of said document.

40. The apparatus of claim 38 wherein said first scanning range does not overlap with said second illuminating range and said second scanning range does not overlap with said first illuminating range.

41. The apparatus of claim 38 wherein said first group of light sources and said second group of light sources are positioned such that said first illuminating range and said second illuminating range illuminate said front and back surfaces of said document at substantially different scan locations of said document.

42. An apparatus comprising:
a light-emitting module comprising a first light source having a first illuminating range and a second light source having a second illuminating range, wherein said first light source and said second light source are capable of illuminating a front surface and a back surface of a document respectively;
wherein said first light source comprises a first light element capable of emitting light of a first color and a second light element capable of emitting light of a color that is different from the first color and said second light source comprises a third light element capable of emitting light of a third color and a fourth light element capable of emitting light of a color that is different from the third color;
a first group of sensors having a first scanning range, wherein said second illuminating range does not overlap with said first scanning range;
a second group of sensors having a second scanning range, wherein said first illuminating range does not overlap with the second scanning range; and
an illumination control that controls a timing of emitting light from said first light source and said second light source such that said first light source and said second light source emit light from said light elements sequentially.

43. The apparatus of claim 42 wherein the first light source and the second light source comprise one or more light-emitting diodes.

44. An apparatus comprising:
a first means for lighting having a first illuminating range capable of illuminating a front surface of a document being scanned;
a second means for lighting having a second illuminating range and capable of illuminating a back surface of said document;
wherein said first means for lighting comprises a first light element configured to emit light of a first color and a second light element configured to emit light of a second color and said second light source comprises a third light element configured to emit light of a third color and a fourth light element configured to emit light of a fourth color;
wherein said first means for lighting and said second means for lighting are positioned such that said first illuminating range and said second illuminating range illuminate said front and back surfaces of said document, respectively, at substantially the same scan location of said document; and
means for controlling a timing of said scanning such that said first means for lighting and said second means for lighting do not activate light clement means of the same color simultaneously.

45. An apparatus comprising:
a first means for lighting having a first illuminating range capable of illuminating a front surface of a document being scanned;
a second means for lighting having a second illuminating range and capable of illuminating a back surface of said document;
wherein said first means for lighting comprises a first light element configured to emit light of a first color and a second light element configured to emit light of a second color and said second means for lighting comprises at least a third light element configured to emit light of a third color and a fourth light element configured to emit light of a fourth color;
wherein said first means for lighting and said second means for lighting are positioned such that said first illuminating range and said second illuminating range illuminate said front and back surfaces of said document, respectively, at different scan locations of said document; and
means for controlling a timing of said scanning such that said first means for lighting and said second means for lighting do not activate light element means of the same color substantially simultaneously.

46. The apparatus of claim 45 wherein said means for controlling sequentially activates said light element means.

47. The apparatus of claim 45 wherein said controlling means is operable to cause each of said light element means of said first lighting means to be activated before any of said light element means of said second lighting means.

48. The apparatus of claim 45 wherein the first means for lighting and the second means for lighting each comprise a red light source, a green light source and a blue light source.

49. The apparatus of claim 45 wherein the first color and the second color are different colors and the third color and fourth color are different colors.

50. An apparatus comprising:
means for emitting light comprising a first means for lighting having a first illuminating range capable of illuminating a front surface of a document being scanned, and a second means for lighting having a second illuminating range and capable of illuminating a back surface of said document;
wherein said first means for lighting and said second means for lighting each comprise a first light element means for emitting light of a first color and a second light element means for emitting light of a different color;
wherein said first means for lighting and said second means for lighting are positioned such that said first illuminating range and said second illuminating range illuminate said front and back surfaces of said document at different scan locations of said document; and
means for controlling a timing of said scanning such that said first means for lighting and said second means for lighting activate light element means of the same color at least partially concurrently.

* * * * *

UNITED STATES PATENT AND TRADEMARK OFFICE
CERTIFICATE OF CORRECTION

PATENT NO. : 7,388,691 B2
APPLICATION NO. : 10/248866
DATED : June 17, 2008
INVENTOR(S) : Wang Page 1 of 1

It is certified that error appears in the above-identified patent and that said Letters Patent is hereby corrected as shown below:

On the Title page, Item [73] (Assignee), please replace "Transpecific" with --Transpacific--.
At column 7, line 66, please replace "said first tight source" with --said first light source--.
At column 8, line 57, please replace "said emitting on such" with --said emitting such--.
At column 12, line 6, please replace "light clement means" with --light element means--.

Signed and Sealed this

Eleventh Day of August, 2009

David J. Kappos
*Director of the United States Patent and Trademark Office*